INVENTOR
GUNNAR C. F. ASKER

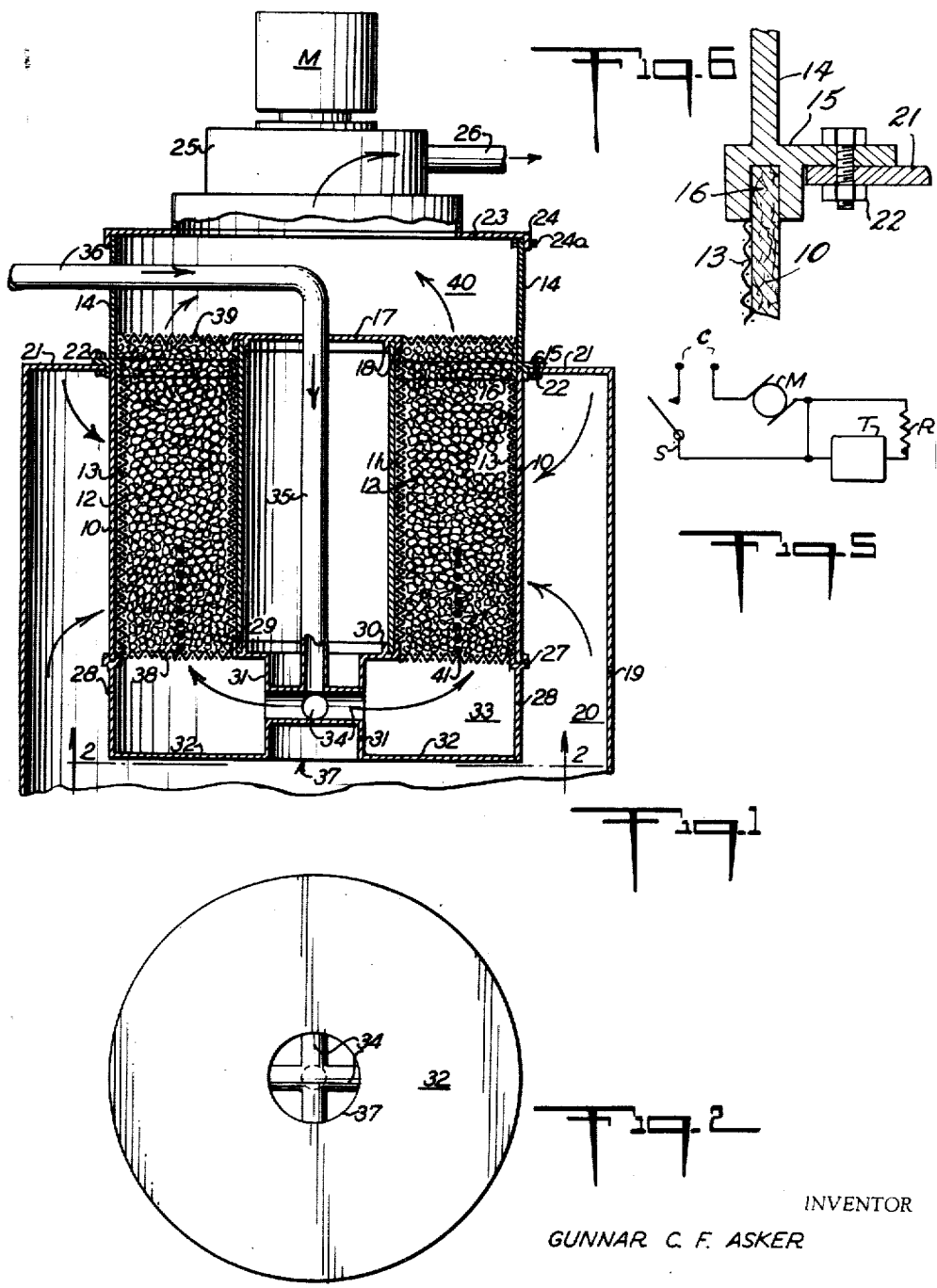

United States Patent Office 2,801,706
Patented Aug. 6, 1957

2,801,706

VALVELESS INTERMITTENT DEHUMIDIFIER

Gunnar C. F. Asker, Washington, D. C., assignor to Desomatic Products, Inc., Falls Church, Va., a corporation of Delaware Application July 23, 1954, Serial No. 445,316

14 Claims. (Cl. 183—4.5)

This invention relates to dehumidifying apparatus for reducing the moisture content of air and other gases and particularly to relatively stationary dehumidifying apparatus comprising a moisture adsorbent bed of drying materials with which moisture-laden gases are contacted and from which the adsorbed moisture may be removed and the adsorbent material regenerated by apparatus operative without valves.

In conventional dehumidifying apparatus such bed of granular moisture adsorbent material such as silica gel, activated alumina, and other granular moisture adsorbent or adsorbent materials known in the art, are operated in moisture absorbing cycles. In a portion of such conventional cycle, air to be dried is passed in contact with the bed to have the moisture content thereof removed by adsorption into the desiccant moisture adsorbent material and in another portion of the cycle, when the desiccant has adsorbed a substantial quantity of water vapor and has its moisture adsorbing efficiency substantially reduced, such bed is regenerated by heating the same while passing a scavenging flow of air through the bed to pick up the adsorbed moisture and remove it from the system. For practical economy of operation of such conventional cycle the bed is never operated in a gas drying phase for a sufficiently great period to be fully saturated, since there is substantial reduction in adsorbing efficiency of the bed towards the end of such drying cycle; nor is the bed usually regenerated to absolute dryness to remove all traces of adsorbed moisture during the regenerating cycle, since such extreme operation in that phase, too, would be inefficient. Commercial dehumidifying apparatus in present use is generally a compromise between the two phases of the cycle as to the length of either for optimum economy.

A substantial source of low economy is in expensive construction to operate valves in timed relation to the drying and regenerating phases of the cycle for control of air flow in conjunction with the drying bed; to direct air to be dried in contact therewith, recycling the same back to the desired dehumidifier air space; and for control of passage of regenerating air through the bed, usually ordinary air for scavenging moisture from the bed, and disposing of the moisture laden scavenging air, after it has picked up moisture from the bed in regeneration thereof, to a waste gas disposal area outside of the system being dehumidified.

According to the present invention, gas drying apparatus is provided which is entirely valveless in operation and which allows for substantially large drier installations which may be relatively stationary in character.

A primary characteristic of this invention is the housing of the drying bed in a moisture permeable wall tending to act as a barrier against rapid flow of air to be dehumidified therethrough to the desiccant material. That barrier, while being permeable to the passage of both moisture and air is sufficiently resistant to gas flow to have a preferential directing effect to the flow of gas on either side whereby, while a portion of the gas on either side may penetrate the barrier, a larger volume of gas will tend merely to contact the surface without actual penetration. Advantage of such property is taken in the present air drier construction to allow independent air drying and bed regenerating cycles by different gases without substantial admixture, thereby to produce a dehumidified gas on the one hand, and a moisture-laden regenerating gas on the other, in relatively independent flow cycles.

A second feature of the invention is in the construction of apparatus which has a relatively large moisture adsorbent surface, comprising the aforementioned moisture permeable barrier, whereby such large quantities of moisture bearing gas to be dehumidified may be contacted therewith that dehumidification thereof is sufficiently rapid and efficient by mere surface contact that complete penetration in depth of the moisture adsorbent bed by the entire body of gas to be dehumidified is not essential. That type of construction due to its great efficiency allows passage of gas to be dehumidified over such surface in forced or induced flow, in highly variable rates, as desired; or the gas in contact with the moisture permeable barrier need have no mechanically applied flow, as by using a blower, but optionally allows dehumidification of an air space statically by mere contact of the gas in the space to be dehumidified with such surface with no flow other than might incidentally be present by convection currents resulting from slight temperature differentials from heat developed latently in the condensation of moisture upon the adsorbing surface.

Great advantages of this novel construction will be apparent not only in the simplification by omission of valves to direct gas flow, but also in greater efficiency available from static dehumidification in one type of cycle, and finally, in the wide selectivity possible in the timing range of the bed regenerating cycle applied periodically.

Other advantages will be apparent from the description of the construction shown in the drawings which now follows in which:

Fig. 1 illustrates in vertical section the simplest form of the apparatus adapted to adsorb moisture statically with dynamic regeneration of the bed;

Fig. 2 is a bottom view in the direction of the arrows on line 2—2 of Fig. 1;

Fig. 5 is a diagram of the electrical circuit useful for either form of apparatus; and Fig. 6, is an enlarged detail illustrating the manner of securing the ends of the foraminous barrier.

Figure 3:
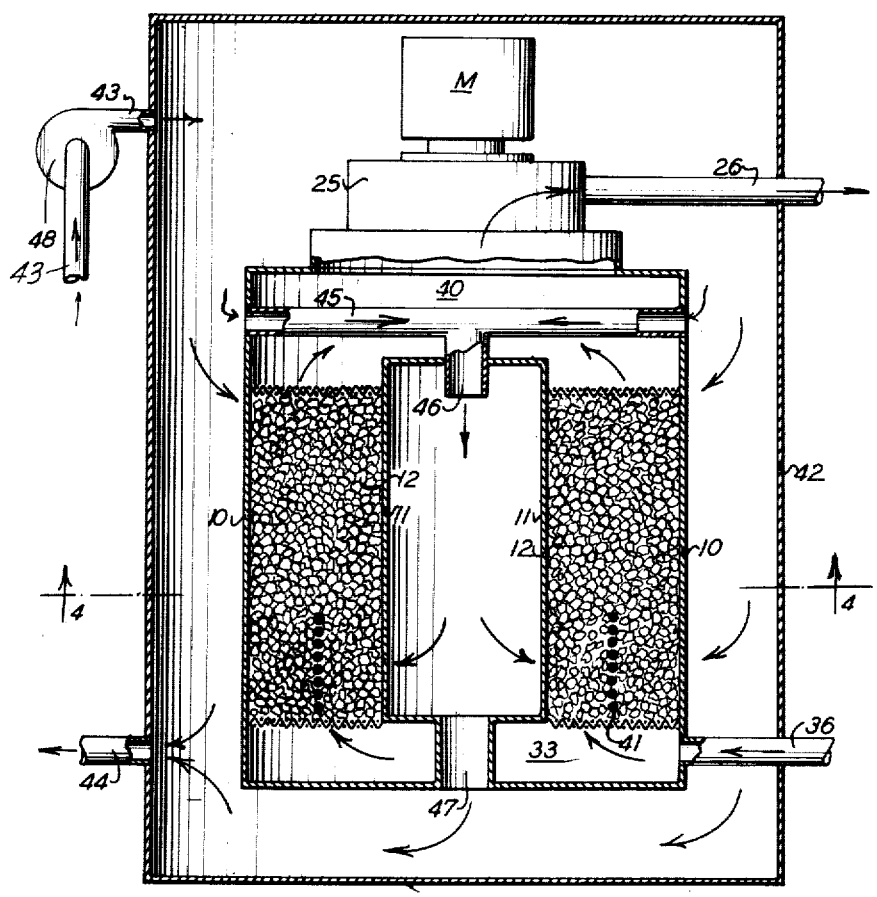
Fig. 3 is the modified dehumidifying apparatus adapted for dynamic gas flow for dehumidification thereof as well as dynamic flow for regeneration of the bed.

In the drawings 11 and 10 are respectively inner and outer concentrically arranged cylindrical shells of foraminous barrier elements. Such foraminous barrier element is made preferably of matted fibrous material wherein the fibers are sufficiently matted, felted, or partially adhesively and porously adhered to each other to form a porous structure of substantial strength to retain their shapes herein shown as cylindrical, while supporting internally between the concentric cylindrical shells a bed of granular moisture adsorbent material 12. The bed of granular air drying material 12, is supported between lower 38 and upper 39 screens so that it lies upon the screen 38 and is confined between the vertical foraminous cylindrical walls 10 and 11. The bed of granular material may be of variable depth and the foraminous barrier cylinders will approximately correspond in height with the depth of the bed as shown.

The construction of the foraminous barrier material may be compressed fibrous material such as metal or glass wool fiber, wool, felt, or may be integral porous ceramic ware, hardened foam rubber, etc., but preferably is matted asbestos fiber formed as described in U. S. patent to Thomas H. Urdahl 2,621,753 issued December 16, 1952. The foraminous barrier is of sheet or board material sufficiently thick, variable with the strength of the material, to mechanically support the weight of a bed of desiccant material which may range from several inches to several feet in depth, as well as other apparatus elements assembled thereto. That integral strength of the foraminous barrier material may be enhanced and reinforced if desired where needed by metal or plastic screening mounted about a surface thereof for reinforcement; or that screening may be embedded within the body of the fiber sheet or board as desired for reinforcement. The screening itself is of such large mesh as to perform this reinforcing function without in itself affecting the gas or vapor flow through the barrier material. That barrier material, moreover, will have relatively small pores to allow gas or vapor passage through the pores of the fiber in comparison with interstices between the granular desiccant material, as will appear. Such porous structure of the barrier material will impart some resistance to gas flow therethrough to allow a pressure drop across the barrier of gas blown therethrough under pressure of at least about 0.2 lbs., but it may have a considerably higher resistance such as up to 10 lbs., inasmuch as that barrier material porosity while necessarily less than the porosity of granular desiccant, will be low enough to impede normal air passage therethrough somewhat, but will not impede moisture passage condensed in the outer pores of its surface. Thus the primary objective in the barrier material is to attain some porosity therein to allow moisture transfer, but as compared to granular desiccant, it is such reduced porosity that it may greatly impede ordinary air flow therethrough without substantially affecting passage of the moisture through the barrier material. The barrier material may range in thickness from $\frac{1}{16}$ to $\frac{1}{2}$ inch more or less providing the desired porosity differential with respect to the porosity of the granular material is maintained.

In contrast to such barrier material, the granular desiccant material is highly porous, usually varying in particle size from about 5 to 20 mesh, whereby the interstices between particles, as well as porous internal structure of each, present little if any resistance to the flow of gases through a granular bed of this material.

As shown in Fig. 1, the barrier cylinders 10 and 11 reinforced if necessary with screening 13 has mounted thereabove a cylindrical shell 14 which has extending near the lower end thereof, a shell supporting flange 15. As shown in detail Fig. 6, the lower end of shell 14 below flange 15 has a securing groove 16 at the cylindrical lower bottom in which is mounted the cylindrical top of the outer foraminous material body 10 for substantially gas-tight support therein. The foraminous barrier material needs no unusual or extra sealing means and insertion in the groove in snug fit suffices to prevent substantial gas interchange around the end of the foraminous material secured within the groove 16. As shown the groove 16 may be the downwardly opened end of an annular channel iron shaped construction from which the flange 15 extends laterally outward. The inner cylindrical body of foraminous material 11 has a top plate 17 having a grooved flange 18 about its periphery which mates with the top of said cylindrical body 11 for similar securement thereof.

The cylindrical porous barrier 10 may be inserted into an opening of a tank or other chamber comprising confining walls 19 whose internal air or other gas volume therein 20 is desirably dehumidified. The shell 14 portion protruding from the tank 19 is fastened by its surrounding flange 15 to the top 21 of the tank 19 through bolts 22 or other suitable fastening means. The upper end of the cylindrical shell 14 has a flat disc cover plate 23 likewise suitably flanged at 24 about its periphery to fit as a cover over the cylindrical shell 14 and may be bolted thereto by bolts 24a. In the center of the top plate 23 an induced draft blower or fan 25 is mounted to draw air upward through the bed of granular desiccant 12 by suction from the upper portion of the shell space 40 discharging the same through duct 26. This is bed regeneration gas, and the duct 26 leads outside of the system to a waste gas disposal area. For purposes of this design, the duct 26 should have a length at least ten times its diameter.

The lower end of the cylindrical foraminous barrier 10 is secured in a grooved shell wall 27 of a cylindrical plate 28. The inner cylindrical foraminous barrier element 11 has its lower end 29 secured in a grooved flange 30 in an inner cylindrical plate 31. The two concentric cylindrical plates 28 and 31 define between them a lower plenum 33 by having their lower ends closed by an annular plate 32. The plenum chamber 33 enclosed between cylindrical walls 28 and 31 and between bottom plate 32 and upper bed supporting screen 41 communicates with several air inlet ducts 34 which communicate in turn with a central scavenging inlet air duct 35 passing vertically upward to communicate with a horizontal duct 36 as a supply source of regenerating gas passed therein, the horizontal duct 36, passing through the upper cylindrical shell wall 14 in gas-tight fit therethrough. The lower plate 32 has a relatively large central opening 37 through which surrounding gas to be dehumidified readily passes upwardly to contact the foraminous barrier wall of internal cylinder 11 so that air in the chamber 20 may be dehumidified statically by contacting both foraminous barrier walls 10 and 11.

Above the bed 12 an open space comprising an upper plenum 40 is formed from which gas, after passing through the desiccant bed, passes evenly by suction to the fan or blower 25 and thence out through duct 26.

For purposes of regenerating the bed, conventional electrical heating elements 41 are mounted in the lower part of the bed, such heating elements being ordinary coils of electrical resistance wire such as shown in my prior Patent 2,671,525 issued February 1, 1954.

A suitable electrical circuit is illustrated diagrammatically in Fig. 5. When it is desired to regenerate the bed 12 a switch S is closed to complete a circuit from any suitable source such as 110 volts 60 cycle A. C. current through input wires C. The current activates the fan motor M which drives the fan and draws regenerating gas through the bed 12 from any source communicating with duct 36 and simultaneously resistance wires R corresponding to heating elements 41 embedded within the bed supplies sufficient heat thereto to vaporize the adsorbed moisture. If desired, as shown in my patent referred to above and my Patent 2,606,627 issued July 8, 1952, the circuit and construction may be modified to include a thermostat T to avoid overheating of the bed, and the timing of the regenerating cycle may be made automatic.

As an example of barrier material suitable in the above construction, and as described in the Urdahl patent above referred to, asbestos is graded as to be readily matted, all of the smaller fibers shorter than about ⅛ inch having been removed so that the asbestos does not tend to pack or felt. The asbestos fiber of uniformly large size is desirably washed to remove all particles of duct-like character. The fiber is suspended in a slurry in water to which may be added a small quantity of a water soluble binder, such as from .05 to 3% by weight of the water suspending medium, of a binder such as water soluble phenol-aldehyde or furfural resins or ordinary cold water starch. The asbestos slurry is then passed through a screen as typically used in paper making to form a sheet or mat of desired thickness; or, where it is desired to construct the foraminous barrier material with internal reinforcement, a corresponding thin glass fiber sheet or mat or a metal screen is placed as a layer over a first matted portion so deposited, and a second layer of asbestos is deposited thereon to the desired thickness. As mentioned such thickness may be from 1/16 to 1/2 inch, preferably about 1/8 to 1/4 inch, in thickness. The mat thus formed with or without the reinforcing layer embedded therein may be dried to an empirical dryness merely by passing warm air through and around it. The entire sheet thus deposited may be bent into cylindrical form with its ends fixed by any suitable binder such as metallic strip seal. Alternatively, the entire matted material may be deposited upon a cylindrical screen internally or externally or both so that no seaming is present in the cylindrical form thus obtained. Finally, the cylindrical barrier material is dried by heating as stated or where a binder is used the temperature is sufficient to decompose the organic binder material, such as a temperature of 250 to 400° C.

The foraminous barrier body thus formed has the property of allowing gases, particularly moisture, to deposit on the surface and become entrapped within the pores thereof, and to diffuse therethrough. Where the screen is mounted with ordinary moisture bearing air on the one side and desiccant material on the other side, the moisture trapped in the porous spaces continuously will pass inwardly to the desiccant material for ultimate adsorption therein. Thus the foraminous material tends to adsorb and trap moisture from the gases about as rapidly as would be obtained by ordinary desiccant material, and the diffusion of moisture through such barrier toward the desiccant material would be relatively rapid.

It is evident, if, for example, a blast of air were blown against such foraminous barrier surface, if that barrier is mounted with a desiccant material on the opposite side substantial moisture would be adsorbed continuously by the contacting dry surface maintained relatively dry by the presence of the desiccant material on the other side of such body, while the great bulk of the air will pass around the contact side. In this manner the air to be dried merely contacts the large porous barrier surface to have a substantial portion of its moisture removed. Thus, for purposes of this invention it is not necessary that any substantial quantity of the gas itself pass through the barrier. It is sufficient that much of the moisture in the gas becomes deposited on the outer porous surface of the barrier. Thereafter, by diffusion, that moisture continuously passes inward to be taken up by the desiccant material.

Accordingly, in operation of the device shown in Fig. 1, the gas in the chamber 19 to be dehumidified comes into external contact with the foraminous barrier walls 10 and 11 which are relatively large in surface area, and moisture is deposited upon the porous surface of the foraminous barrier material, but the gas in contact being dehumidified does not pass through the barrier except in such minor quantities as to be insignificant. The operation, therefore, according to this construction of Fig. 1 is a static dehumidification of the air in the chamber 19 by statically depositing its moisture content upon the foraminous surface. The moisture passes by diffusion into the bed of moisture adsorbent material continuously being taken up thereby so that there is a progressive dehumidification, a progressive drying of the gas in the chamber by deposition of its moisture and progressive diffusion thereof into the desiccant material. No applied circulation according to the structure of Fig. 1 need be given to the gas in the chamber to be dehumidified, but small eddy currents will take place by some slight temperature rise due to deposition of moisture and generation of latent heat of condensation thereof upon the surfaces 10 and 11.

At indefinite periods of from 2 to 48 hours or even longer, depending on the quantity or capacity of the desiccant to adsorb moisture and the moisture content of the air in chamber 19, the bed is regenerated dynamically.

The regeneration may be regulated automatically, if desired, but since the timing of regeneration is not critical with this type of construction, the periods of regeneration may be applied by the judgment of the operator. The bed may be regenerated by switching on the electrical circuit to supply heat electrically to the heater elements 41 within the bed and the fan or blower 25 started. That fan, taking suction from the upper plenum chamber 40, draws air through the heated bed passing upwardly from the lower plenum in turn taking its regeneration gas through ducts 35 and 36 from some outside source of regenerating gas. Since the gas flows by a suction there will be no tendency of that regenerating gas, due to lower pressure resistance of the bed than of the foraminous barrier, to pass outwardly through the barrier. Rather, the pressure is inward, so that there will be little gas exchange through the barrier during regeneration, although some minor quantities of gas from the space to be dehumidified may leak through by its greater pressure. This, however, is not critical and does not affect the great economy of operation of this installation.

Thus, as described, the apparatus of Fig. 1 will adsorb moisture by deposition on its outer surface statically and be regenerated at will dynamically by heating the bed and drawing air therethrough by suction from an extraneous source. As shown in Fig. 1 the entire apparatus may be mounted within a chamber 19 in a manner from which it may be removed if desired for use elsewhere. If desired the entire apparatus may be made more compact and portable to be placed in a room such as a cellar to be dehumidified, operated statically for a period of time, and then taken out-of-doors to another space where dehumidification is not necessary and the bed regenerated outside of such space.

The entire apparatus operates without valves and does not require expensive construction other than the simple fan and electrical heater element within the bed. The direction of the gas flow is entirely effected by the foraminous barrier material which under the peculiar construction hereof does not allow sufficient exchange of gas to affect the flow of moisture either for dehumidification, or for removal of moisture from the bed in passage of gas therethrough for regeneration.

Figure 4:
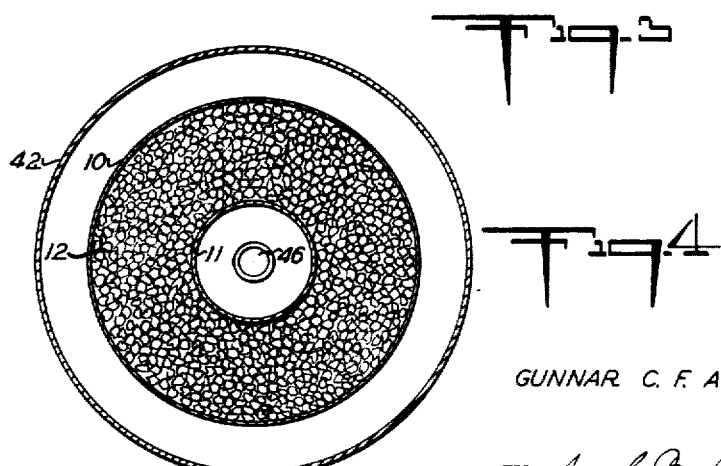
Fig. 4 is a section in plan through about the center of the apparatus of Fig. 3 taken on a line 4—4 of Fig. 3.

It is possible however to modify the apparatus slightly to obtain dynamic flow of gas in the dehumidification cycle as well as dynamic flow of gas in the regeneration. Such construction is shown in Figs. 3 and 4. For this purpose the entire apparatus is mounted within a dehumidification housing or shell 42, which has a main inlet duct 43 for passage of gas to be dehumidified therein, and an outlet duct 44 for removal of the gas from the housing 42 after it has contacted the foraminous barrier surfaces 10 and 11 for deposition of its moisture thereon.

For dynamic flow according to this modification a large duct 45 is mounted in the upper plenum chamber 40 to allow flow of gas from the surrounding gas space within shell 42 through such duct from opposite sides towards the center outlet 46 and thence downward in contact with the inner foraminous barrier wall 11. Then after contact with the cylindrical wall 11, out of the bottom 47 through an enlarged opening. Thus, all of the gas passing into the housing 42 dynamically by a suitable blower 48 interposed in the inlet duct 43 is flowed in contact with the outer cylindrical barrier wall 10 and, by way of ducts 45 and 46 with the inner barrier wall 11. Thus, there is dynamic flow of gas in contact with all of the foraminous barrier adsorbent surfaces. The construction of this Fig. 3 is otherwise the same as in Fig. 1. The only change in this modification is that there is dynamic flow of gas both to external and internal barriers for dehumidification, as well as dynamic flow of gas inward through a duct 36 now placed at the bottom to communicate directly with the lower plenum chamber 33 and induced passage of the scavenging gas through the bed 12 and out through duct 26 for regeneration.

The type of construction of Fig. 3, inasmuch as dynamic flow of gas passes to the inner barrier walls 11 for better circulation through inlet 46, allows construction of several concentrically mounted cylindrical barrier walls 11, forming as many concentric beds 12 as desired, there being several inner inlets 46 as a manifolding supplying gas to each inner wall, thus increasing as much as desired the adsorbent surface capacity of the unit. It will be appreciated that by this type of construction, entirely valveless, the adsorbent surfaces may be made indefinitely large for greatly increased efficiency of the unit for drying of air in as large capacity as desired. For this purpose, beds 12 may be made indefinitely narrow and deep so as to mount several concentric beds 12, as desired. Moreover, such beds are not necessarily cylindrical but may be made rectangular, and may even comprise single rectangular beds mounted in rows between a lower plenum chamber and an upper plenum chamber, each surface being separately supplied by a duct to feed gas to be dehumidified therethrough for optimum circulation.

It will be appreciated that the foraminous barrier material may be made of any porous substance which inherently will trap moisture by contact of a moisture containing gas therewith, so that the operation of this device is not dependent primarily upon the character of the foraminous material. It may be of any nature providing it has a porosity somewhat less than the porosity of the granular material of the bed. Thus it may be, as pointed out, of natural porous ceramic ware, of porous hardened foam rubber, or of fibrous material. Moreover, the thickness of such foraminous material is not critical inasmuch as it may be used in combination with screening to give it structural strength.

While, as noted, some gas from the portion being dried may seep through to the desiccant bed, this will be in extremely small quantity in the instance of static dehumidification and slightly greater in dynamic flow of gas to be dehumidified. The quantities in any case are not sufficiently large to affect the economy of the operation. Moreover, a slight gas seepage through the foraminous barrier wall enhances somewhat the rate of diffusion of entrapped moisture within the surface pores into the desiccant bed.

I claim:

1. A gas dryer comprising a casing enclosing gas to be dried, a gas permeable bed of granular desiccant material in said casing, a moisture permeable barrier separating said bed from the gas to be dried in contact with the bed of granular desiccant on one surface and exposed to the gas to be dried on the other, said barrier material having a porosity less than said bed of granular desiccant material and sufficiently low to impede free flow of gas therethrough, and means for dynamically flowing a scavenging gas through confining ducts from a source outside of said casing through said granular bed for removal of moisture therefrom and out of said casing.

2. A valveless gas dryer comprising a housing enclosing a chamber containing gas to be dried, a bed of gas permeable granular desiccant material in said chamber, a moisture permeable foraminous barrier in contact with said desiccant material on one surface, separating the bed from the gas to be dried in said chamber, said barrier being in contact with the gas to be dried on its opposite surface, duct means connecting one side of said bed with a source of regenerating gas, means connecting the opposite side of said bed to a point of disposal of regenerating gas outside of said housing, and blower means for dynamically flowing regenerating gas through said duct means and bed for regeneration thereof, said regenerating gas flow being maintained substantially separated from the gas to be dried in said chamber by said foraminous barrier and means for heating said bed during regeneration thereof.

3. A valveless gas dryer comprising a housing enclosing a chamber having gas therein to be dried, a gas permeable bed of granular desiccant material mounted in said chamber, a foraminous partition in contact with said bed on one surface and in contact with the gas to be dried on the other, said foraminous material having a porosity less than that of the granular desiccant material and sufficiently low to impede free flow of gas therethrough whereby said foraminous material allows moisture diffusion but resists substantial passage of gas therethrough, an inlet duct supplying gas for regeneration of said bed directly to one side of said bed from a source outside of said housing, an outlet duct leading moisture regenerating gas after passage through said bed from a side opposite to the inlet thereof to a point outside of said housing for disposal thereof, and means for periodically inducing dynamic flow of regenerating gas through said bed.

4. A gas dryer as defined in claim 1, wherein said bed has means for periodically heating said bed for enhancing the regeneration thereof.

5. The method of dehymidifying a gas comprising maintaining the gas to be dehumidified in contact with the outer surface only of a porous barrier confining a granular desiccant material, said barrier having a porosity less than that of the granular desiccant material and sufficiently low to impede free flow of gas therethrough, whereby moisture deposits on the surface of the barrier and diffuses into said bed of moisture absorbent material without substantial penetration of said barrier by the gas to be dehumidified, and independently regenerating said bed of desiccant material without substantial admixture of moisture laden regenerative gases with the gas to be dehumidified, said regeneration being effected by passage of a regenerative gas dynamically through said bed while supplying heat to said desiccant material.

6. The method as defined in claim 3 wherein the gas to be dehumidified is flowed dynamically over the surface of said bed.

7. The method as defined in claim 3, wherein the porous barrier is selected from the group consisting of porous ceramic material, porous matted fibrous material and porous foam rubber.

8. Gas drier comprising a housing enclosing a chamber, inlet and outlet ducts leading to and from said chamber for passage of gas to be dehumidified therethrough, means communicating with one of said ducts for dynamically passing gas through said chamber, a bed of desiccant material mounted in said chamber having a wall of foraminous barrier material in contact with said bed on one side and with the gas to be dehumidified on the opposite side thereof, said foraminous material having a porosity less than that of said bed of granular desiccant material and sufficiently low to impede free flow of gas therethrough thereby serving to prevent substantial mixture of gas to be dehumidified with gas passed through said bed for regeneration thereof, and means for separately passing a regenerating gas through said bed and disposing of the moisture laden gas after passing through said bed outside of said housing.

9. Gas drier comprising a bed of granular desiccant material having a layer of moisture permeable foraminous material in contact with said bed on one side of said layer, said layer being exposed to gas to be dried on the other side, said foraminous material being selected from the group consisting of matted fiber, porous ceramic ware, and foam rubber, each material having a porosity less than that of the granular desiccant material and sufficiently low to impede free flow of gas therethrough whereby said material has substantial moisture permeability but reduced gas permeability thereby tending to impede intermixture of gases passing on opposite sides thereof, electrical heating means disposed within said granular bed of desiccant material adapted to supply sufficient heat thereto to vaporize adsorbed moisture therefrom, duct means leading a scavenging gas to said bed and duct means adapted to lead scavenging gas away from said bed after traversing the same to pick up moisture evolved therefrom and means in said duct leading away from said bed to periodically induce gas flow therethrough.

10. Apparatus as defined in claim 9 wherein the foraminous material layer is reinforced by large mesh metal screening.

11. Gas drier comprising a housing, duct means leading to and from said housing, means for impelling gas to be dried into and out of said housing, a bed of granular desiccant material in said housing having a layer of moisture permeable foraminous material in contact therewith on one side and adapted to be exposed to the gas to be dried on the other, said foraminous material being selected from the group consisting of matted fiber, porous ceramic ware, and foam rubber each material having a porosity less than that of the granular desiccant material and sufficiently low to impede free flow of gas therethrough, electrical heating means disposed within said granular bed of desiccant material adapted to supply sufficient heat thereto to vaporize adsorbed moisture therefrom, duct means adapted to lead a scavenging gas to said bed and duct means adapted to lead scavenging gas away from said bed after traversing the same to pick up moisture evolved therefrom and means in said duct leading away from said bed to periodically induce gas flow therethrough.

12. Apparatus as defined in claim 11 wherein the foraminous material layer is reinforced by large mesh metal screening.

13. The method of drying gas comprising suspending a bed of granular desiccant material within the gas to be dried, separating said bed from the gas to be dried by a layer of moisture permeable foraminous material having a porosity less than that of the desiccant material and sufficiently low to impede free flow of gas therethrough whereby the gas to be dehumidified will deposit its moisture upon the porous surface of said foraminous layer exposed thereto and pass said moisture into said bed of desiccant material by diffusion without substantial passage of gas being dried through said moisture permeable layer, impelling the gas to be dehumidified in continuous flow against said moisture permeable layer to effect drying thereof during a gas drying cycle, and independently periodically regenerating said bed by passing regenerating gas through said bed at a temperature sufficiently raised to evolve adsorbed moisture therefrom as a vapor and removing the moisture laden regenerating gas therefrom as a bed regenerating cycle.

14. The method as defined in claim 13 wherein the foraminous layer is selected from the group consisting of porous ceramic ware, porous matted fibrous material, and porous foam rubber.

References Cited in the file of this patent

UNITED STATES PATENTS

| | | |
|---|---|---|
| 1,429,856 | Etter | Sept. 19, 1922 |
| 2,215,323 | Guthrie | Sept. 17, 1940 |
| 2,223,586 | Thomas | Dec. 3, 1940 |
| 2,506,578 | Case | May 9, 1950 |
| 2,517,537 | Anderegg | Aug. 8, 1950 |
| 2,596,979 | Case | May 20, 1952 |
| 2,621,753 | Urdahl | Dec. 16, 1952 |

FOREIGN PATENTS

| | | |
|---|---|---|
| 409,652 | Great Britain | Aug. 2, 1932 |

UNITED STATES PATENT OFFICE

CERTIFICATE OF CORRECTION

Patent No. 2,801,706                                                    August 6, 1957

Gunnar C. F. Asker

It is hereby certified that error appears in the printed specification of the above numbered patent requiring correction and that the said Letters Patent should read as corrected below.

Column 8, line 15, after "moisture" insert -- containing --; lines 40 and 43, for the claim reference numeral "3", each occurrence, read -- 5 --.

Signed and sealed this 4th day of February 1958.

(SEAL)
Attest:

KARL H. AXLINE                                             ROBERT C. WATSON
Attesting Officer                                        Commissioner of Patents